(12) United States Patent
Throndsen

(10) Patent No.: US 12,075,753 B2
(45) Date of Patent: Sep. 3, 2024

(54) ANIMAL BED HAVING DUAL INDEPENDENT SUPPORT CHAMBERS

(71) Applicant: Advanced Comfort Technology, Inc., Sun Prairie, WI (US)

(72) Inventor: Dean R. Throndsen, The Villages, FL (US)

(73) Assignee: CGW CANADA, INC., Drayton (CA)

( * ) Notice: Subject to any disclaimer, the term of this patent is extended or adjusted under 35 U.S.C. 154(b) by 0 days.

(21) Appl. No.: 18/452,157

(22) Filed: Aug. 18, 2023

(65) Prior Publication Data

US 2023/0389513 A1 Dec. 7, 2023

Related U.S. Application Data

(63) Continuation of application No. 17/586,301, filed on Jan. 27, 2022, now Pat. No. 11,771,054, which is a continuation of application No. 16/439,014, filed on Jun. 12, 2019, now Pat. No. 11,266,119, which is a continuation of application No. 15/660,661, filed on Jul. 26, 2017, now Pat. No. 10,334,817, which is a continuation of application No. 15/093,455, filed on Apr. 7, 2016, now Pat. No. 9,743,639, which is a continuation of application No. 13/839,891, filed on Mar. 15, 2013, now Pat. No. 9,332,735.

(60) Provisional application No. 61/643,755, filed on May 7, 2012.

(51) Int. Cl.
*A01K 1/03* (2006.01)
*A01K 1/015* (2006.01)
*A01K 1/035* (2006.01)
*A01K 29/00* (2006.01)

(52) U.S. Cl.
CPC .......... *A01K 1/0353* (2013.01); *A01K 1/0157* (2013.01); *A01K 29/00* (2013.01)

(58) Field of Classification Search
CPC .... A01K 1/0157; A01K 1/015; A01K 1/0353; A01K 29/00; A47C 27/081; A47C 27/085; A47C 27/10; A47C 20/048; A47G 9/1027; A61G 7/05769
See application file for complete search history.

(56) References Cited

U.S. PATENT DOCUMENTS

| | | | | |
|---|---|---|---|---|
| 2,731,652 A | * | 1/1956 | Bishop | A47C 27/081 297/DIG. 3 |
| 4,076,872 A | * | 2/1978 | Lewicki | B60R 19/20 428/72 |
| 4,190,286 A | * | 2/1980 | Bentley | B60N 2/914 297/284.3 |
| 4,247,963 A | * | 2/1981 | Reddi | A47C 27/10 5/687 |

(Continued)

*Primary Examiner* — Yvonne R Abbott-Lewis
(74) *Attorney, Agent, or Firm* — David J. Schnurr

(57) ABSTRACT

A bed for at least one animal is provided. The bed includes a strip of belting having a front end, a back end, and opposing sides, an animal bed having a first fluid chamber and a second fluid chamber. A first fluid supply tube is in fluid connection with the first chamber, and a second fluid supply tube is in fluid connection with the second chamber, wherein the first and second chambers are fluidly isolated from one another. A method of preparing for use a bed for at least one animal is also provided. In addition, a system for using a bed for at least one animal is also provided.

14 Claims, 14 Drawing Sheets

(56) References Cited

U.S. PATENT DOCUMENTS

| | | | | |
|---|---|---|---|---|
| 4,405,129 A * | 9/1983 | Stuckey | A63B 21/0085 | 482/79 |
| 4,685,163 A * | 8/1987 | Quillen | A47C 27/081 | 5/613 |
| 4,697,290 A * | 10/1987 | Alklind | A61G 7/001 | 5/710 |
| 4,893,367 A * | 1/1990 | Heimreid | A61G 13/12 | 5/632 |
| 4,962,553 A * | 10/1990 | Marquis | A47C 27/10 | 5/710 |
| 5,044,030 A * | 9/1991 | Balaton | A47C 27/081 | 5/687 |
| 5,142,720 A * | 9/1992 | Kelso | A61G 7/001 | 5/648 |
| 5,394,577 A * | 3/1995 | James | A61G 7/05776 | 5/730 |
| 5,642,544 A * | 7/1997 | Munoz | A47G 9/10 | 5/655.5 |
| 5,771,514 A * | 6/1998 | Wilhoit | A61F 7/10 | 5/644 |
| 6,152,077 A * | 11/2000 | Bristow | A47C 27/085 | 5/655.5 |
| 6,510,573 B1 * | 1/2003 | Grabe | A47G 9/1027 | 5/490 |
| 6,935,273 B2 * | 8/2005 | Throndsen | A01K 1/0157 | 119/431 |
| 7,069,609 B2 * | 7/2006 | Zheng | A47C 27/10 | 5/687 |
| 7,434,282 B2 * | 10/2008 | Fraser | B29C 66/53461 | 5/655.3 |
| 7,509,699 B1 * | 3/2009 | Tresenfeld | A47C 27/10 | 5/413 AM |
| 9,049,841 B2 * | 6/2015 | Stevens | A01K 1/0157 | |
| 2005/0050637 A1 * | 3/2005 | Graebe | A47G 9/1027 | 5/644 |
| 2006/0123548 A1 * | 6/2006 | Heath | A47G 9/10 | 5/655.5 |
| 2007/0044236 A1 * | 3/2007 | Tatsuno | A47G 9/062 | 5/413 R |
| 2014/0075677 A1 * | 3/2014 | Raghuprasad | A47G 9/1027 | 5/636 |
| 2014/0310878 A1 * | 10/2014 | Herrnsdorf | A61F 5/56 | 5/640 |

* cited by examiner

ANIMAL BED HAVING DUAL INDEPENDENT SUPPORT CHAMBERS

CROSS REFERENCE TO RELATED APPLICATIONS

This application is a continuation of U.S. patent application Ser. No. 17/586,301 filed Jan. 27, 2022 entitled "ANIMAL BED HAVING DUAL INDEPENDENT SUPPORT CHAMBERS," which is a continuation of U.S. patent application Ser. No. 16/439,014 filed Jun. 12, 2019 entitled "ANIMAL BED HAVING DUAL INDEPENDENT SUPPORT CHAMBERS," now U.S. Pat. No. 11,266,119, which is a continuation of U.S. patent application Ser. No. 15/660,661 filed Jul. 26, 2017, entitled "ANIMAL BED HAVING DUAL INDEPENDENT SUPPORT CHAMBERS," now U.S. Pat. No. 10,334,817, which is a continuation of U.S. patent application Ser. No. 15/093,455 filed Apr. 7, 2016, entitled "ANIMAL BED HAVING DUAL INDEPENDENT SUPPORT CHAMBERS," now U.S. Pat. No. 9,743,639, which is a continuation of U.S. patent application Ser. No. 13/839,891 filed Mar. 15, 2013, entitled "ANIMAL BED HAVING DUAL INDEPENDENT SUPPORT CHAMBERS," now U.S. Pat. No. 9,332,735, which claims priority to U.S. Provisional Application No. 61/643,755 filed May 7, 2012, entitled "LIVESTOCK BED WITH INDEPENDENT SUPPORT CHAMBERS AND METHOD OF USE," the contents of each of which are hereby incorporated by reference in their entirety.

FIELD OF THE INVENTION

The present invention relates to bedding for animals. More specifically, the present invention relates to bedding for animals having separate and independent support chambers for the improved support of animals while resting, ruminating, and/or sleeping.

BACKGROUND

Bedding for animals is generally known in the art. Animal owners or caretakers, including farmers and/or zoo keepers, use various materials for animal bedding. For example, animal owners or caretakers often utilize natural materials, for example straw and/or sand, as bedding material for animals. However, using natural materials as animal bedding material has certain drawbacks. Natural materials have a tendency to retain excreted animal waste, including solid waste (e.g. manure or feces) and liquid waste (e.g. urine or milk). As such, the animal owners or caretakers are required to routinely remove and replace the natural bedding materials to maintain animal hygiene. In addition, animals will move and/or rearrange natural bedding material. Thus it is necessary for the animal owner or caretaker to routinely, or even daily, groom the natural bedding material in order to provide a supportive and comfortable bed for the animals. This results in the animal owners or caretakers incurring additional costs associated with the removal, replacement, and routine grooming of natural bedding materials, including the costs for labor and replacement materials.

Other material has been introduced and utilized as bedding material for animals, including flexible rubber matting, and bladder type mattresses filled with air, water, padding, or other materials. However, some of these other materials and associated products used as animal bedding have certain disadvantages.

For example, animal mattresses filled with filler materials, such as flaked rubber or foam, are typically very heavy, and are difficult to move into position. These mattresses require large amounts of manpower or machinery to position the mattresses for use. Further, these mattresses typically structurally deteriorate with use. The mattresses and associated filler materials typically begin to deform by, for example, retaining the shape of the animal. This results in the mattresses becoming less supportive of the animal, losing any cushioning effect.

In addition, certain single bladder type mattresses, such as U.S. Pat. No. 6,152,077 to Bristow, can cause injuries to many animals. The fluid pressure necessary to support larger animals in these single bladder type mattresses can lead to surface instability, adversely affecting the footing of the animal during the process of lying down or standing up on the single bladder type mattress. The surface instability can cause the animal to become unsteady, fall, and/or roll over, which can lead to injury to the animal.

Further, certain animals may be discouraged from using certain single bladder type mattresses due to surface instability. Certain animals that may use a single bladder type mattress are inherently unstable. These animals may refuse to use mattresses having surface instability, as the animals will lose confidence in their respective ability to walk on the unstable mattress.

In addition, single bladder type mattresses are limited to only a single amount of support material provided therein. Single bladder type mattresses cannot be tailored to have different quantities, amounts, or volumes of support material to provide different levels of support in different areas of an animal. For example, a single bladder type mattress is unable to provide one level of support for the head area of an animal and a second level of support, different than the first level, for the body area of the animal.

Flexible rubber matting, filled mattresses, and single bladder type mattresses referenced above have additional limitations. As illustrated in the '077 patent to Bristow, the edge of the mattress closest to the gutter area (i.e. the end of the mattress closest to the rear of the animal) is squared off. This right angle can cause abrasions and injury to an animal's legs and underbelly due to the sharp edge.

SUMMARY OF THE DESCRIPTION

The present invention provides an improved animal bed having independent support chambers to support an animal while resting, ruminating, and/or sleeping. The independent support chambers are independent from one another, and include independent fluid passages for providing fluid to each chamber. In addition, the disclosed animal bed provides an improved back end margin having a tapered end in which the bed slopes away from the support chambers. Further, the disclosed animal bed provides an improved back end margin having an increased length which extends away from the livestock bed and toward a common gutter for animal waste commonly provided next to and/or below the back end margin of a strip of livestock beds.

A bed for at least one animal is provided. The bed includes a strip of belting having a front end, a back end, and opposing sides, an animal bed having a first fluid chamber and a second fluid chamber, the first fluid chamber being provided within the strip of belting and having a first width extending between a first side and a second side of the first fluid chamber, and the second fluid chamber being provided within the strip of belting and having a second width extending between a first side and a second side of the second fluid chamber, a first fluid supply tube in fluid connection with the first chamber and a margin of the strip of belting, and a second fluid supply tube in fluid connection with the second chamber and a margin of the strip of belting, wherein the first and second chambers are fluidly isolated from one another, and the first and second fluid supply tubes are fluidly isolated from one another.

An animal bed for supporting at least one animal is also provided. The animal bed includes a strip of bedding material defined by a first belt coupled to a second belt, the strip of bedding material having a head end opposing a rear end, and a first side opposing a second side, the first and second sides extend between the head and rear ends. At least one animal bed is provided on the strip of bedding material, the animal bed having a first chamber provided between the first and second belt, and a second chamber provided between the first and second belt, the first and second chambers being fluidly isolated from one another. An improved back end margin is provided between the second chamber and the rear end of the at least one animal bed, the improved back end margin being selected from the group consisting of: an extended back end margin having an extended portion, the extended portion extends a second length being greater than a first length of a front margin provided between the head end and the first chamber; an extended back end margin having an extended portion, wherein the strip of bedding material is provided on a pad, the pad includes a support surface and a gutter, the gutter being separated from the support surface by a gutter edge, wherein the gutter is provided below the support surface, the at least one animal bed being provided on the support surface and the extended back end margin extends from the support surface, along the gutter edge, and into the gutter; a sloped portion provided on the back end margin, the sloped portion having a decreasing thickness from a first end of the sloped portion to a second end of the sloped portion provided at the rear end of the strip of belting; and a sloped portion provided on the back end margin, the sloped portion having an acute angle between the sloped portion and an imaginary line through the second belt approximately parallel to the second belt.

An animal bed for supporting animals is also provided. The animal bed includes a strip of bedding material defined by a first belt connected to a second belt, the strip of bedding material having a first end opposing a second end, and a first side opposing a second side, the first and second sides extend between the first and second ends. A plurality of animal beds are provided on the strip of bedding material, each of the animal beds includes a first chamber provided between the first and second belt, a first fluid supply tube in fluid connection with the first chamber and extending outward to one of the first or second ends, a second chamber provided between the first and second belt, and a second fluid supply tube in fluid connection with the second chamber and extending outward to one of the first or second ends, wherein the first and second chambers are fluidly isolated from one another, and the first and second fluid supply tubes are fluidly isolated from one another to allow for independent insertion of fluid into the first chamber and the second chamber.

DETAILED DESCRIPTION

The invention illustrated in the Figures and disclosed herein is generally directed to a strip 100 of animal beds 200, 300, 500 incorporating independent support chambers 210 and an associated method of preparing for use animal beds 200, 300, 500. It should be appreciated that the Figures provided herein are for illustration and are not to scale.

Figure 1:
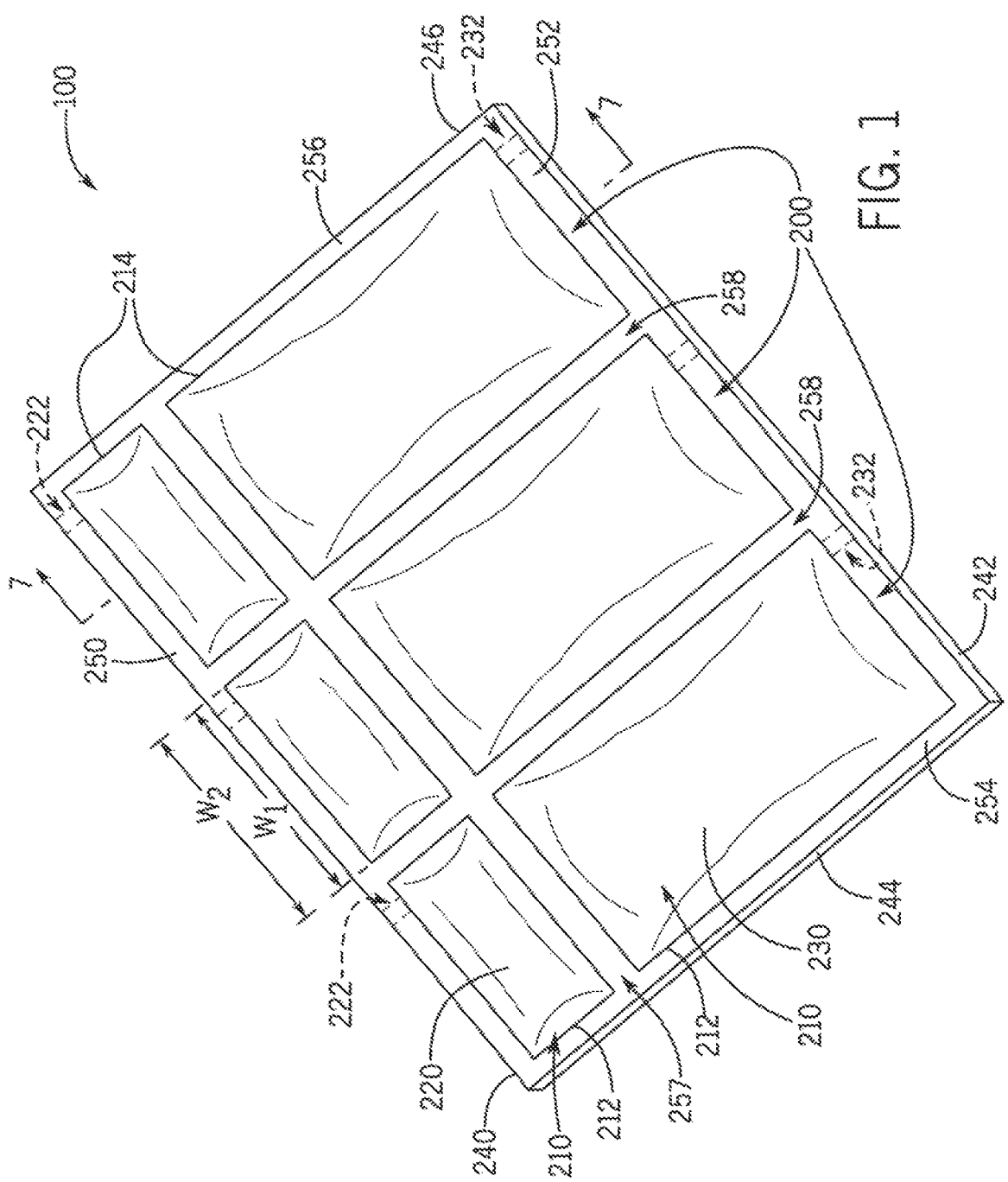
FIG. 1 is an isometric view of one or more examples of embodiments of a strip of animal beds, each animal bed having independent support chambers for the support of the animal while resting, ruminating, and/or sleeping.

Referring now to the Figures, FIG. 1 illustrates one or more examples of embodiments of a strip of animal beds 100 incorporating a plurality of animal beds 200. Each of the animal beds 200 provided on strip 100 incorporate independent support chambers 210 for the support of animals positioned thereon while resting, ruminating, and/or sleeping.

More specifically, FIG. 1 illustrates a bed strip 100 having three animal beds 200. In one or more examples of embodiments, strip 100 may include a single animal bed 200 or may include a plurality of animal beds 200. In practice, the strip of animal beds 100 will be sized and/or customized to the available or desired space where animals rest, ruminate, and/or sleep. The space may include a barn, shed, stable, or other structure in which animals rest, ruminate, and/or sleep, or may be an open air or outdoor space. Additional factors for customization may include the number of animals owned or under the care of a user, and/or the number of animals which a user desires to have rest, ruminate, and/or sleep in the desired location of the strip of animal beds 100. As an example, the strip of animal beds 100 may be sized less than one hundred feet in length, may equal one hundred feet in length, or may exceed one hundred feet in length, wherein the length of the strip of animal beds 100 is the distance between the first and second sides 244, 246.

As illustrated in FIG. 1, each of the animal beds 200 of strip 100 is provided next to one another, such that animals using beds 200 are generally arranged next to one another. In addition, animal beds 200 may be provided generally parallel to one another.

The strip of animal beds 100 may include a front end or head end 240 opposite a back end or rear end 242. Generally, front end 240 and back end 242 may be provided approximately parallel to each other. Front end 240 and back end 242 may be separated by a first side or left side 244, and a second side or right side 246. Generally, first side 244 and second side 246 may be provided approximately parallel to one another. While the strip of animal beds 100 illustrated in FIG. 1 is generally rectangular in shape, in one or more examples of embodiments, the strip of animal beds may be any suitable or desired polygonal shape.

Figure 7:
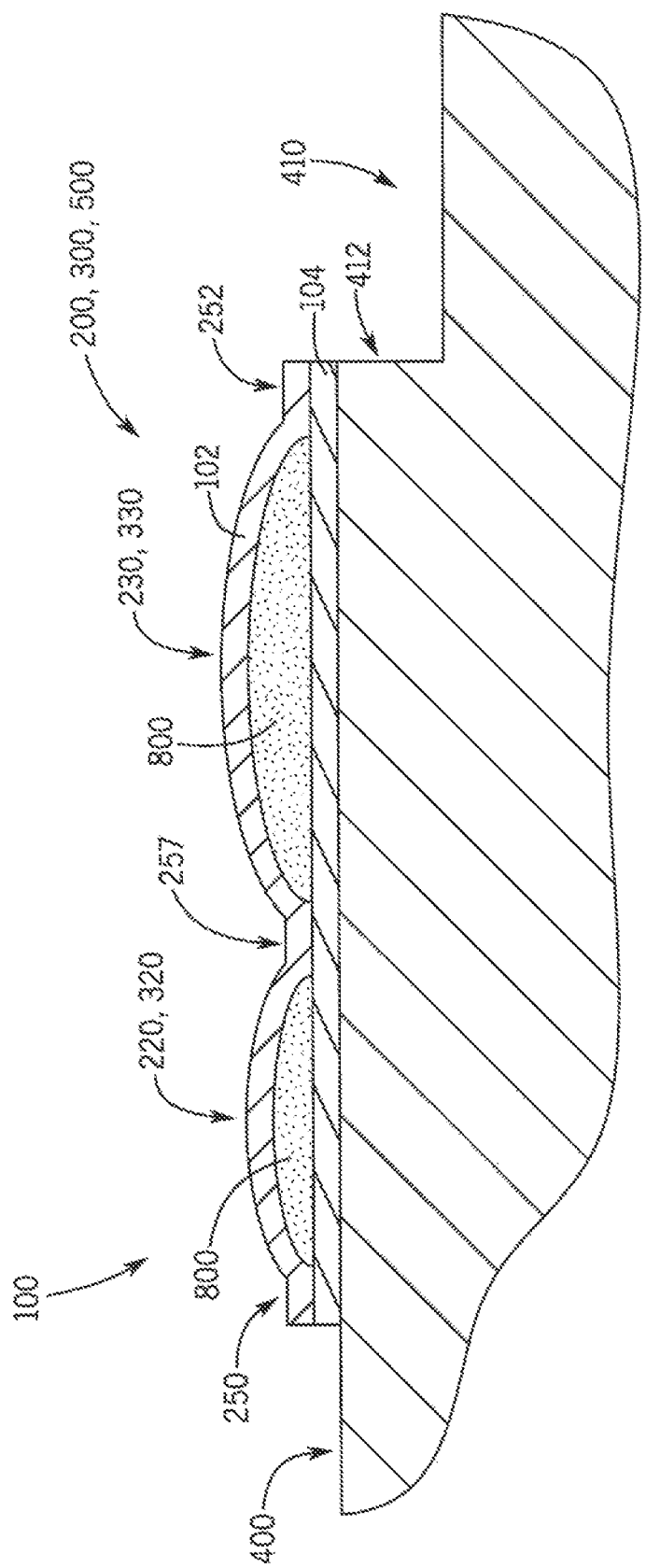
FIG. 7 is a cross sectional view of the animal bed of FIG. 1, FIG. 3, and FIG. 5, taken along line 7-7 of FIG. 1, FIG. 3, and FIG. 5.
Figure 8:
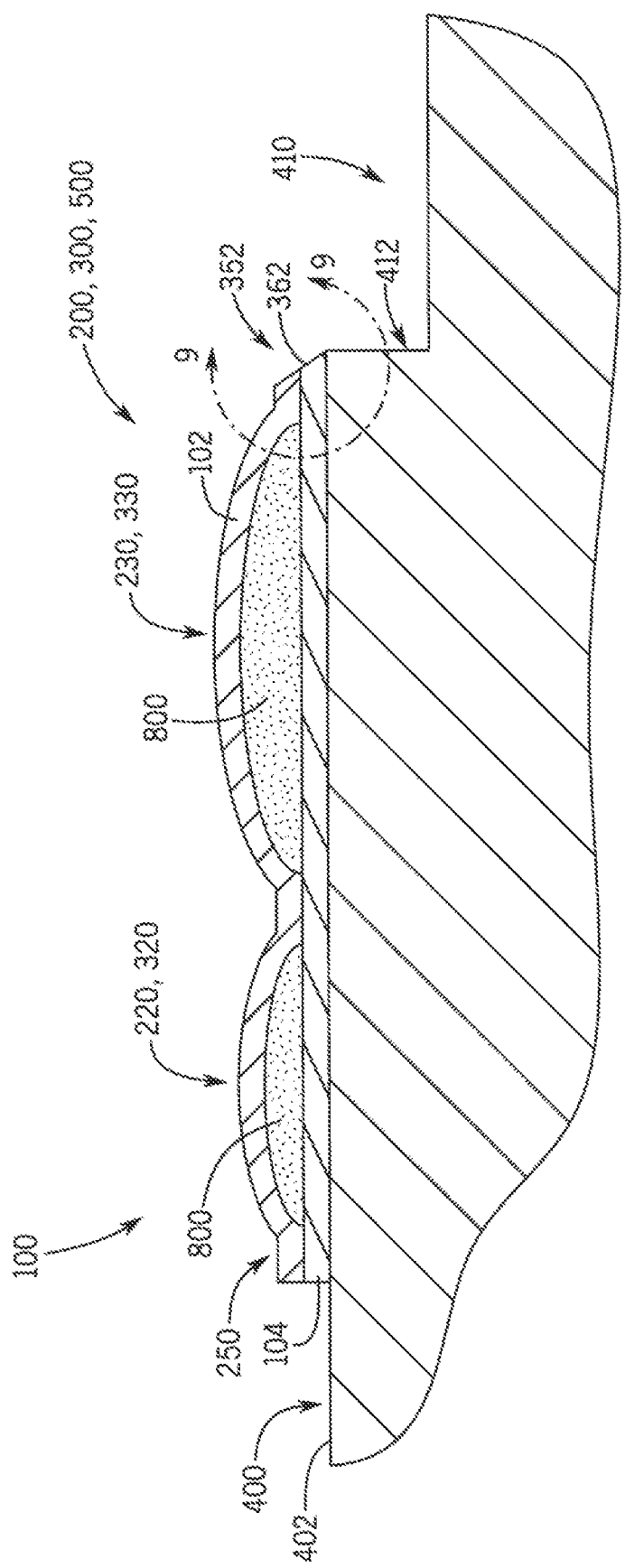
FIG. 8 is a cross sectional view of an alternative embodiment of the animal bed of FIG. 1, FIG. 3, and FIG. 5, illustrating an improved back end margin.

The strip of animal beds 100 may be adapted to be positioned on a support surface 400. As illustrated in FIGS. 7 and 8, strip 100 may be provided atop support surface 400. Support surface 400 may include a gutter 410. Preferably, gutter 410 is provided adjacent or immediately next to support surface 400. In addition, gutter 410 may be provided a distance below support surface 400, separated by gutter edge 412. Accordingly, gutter 410 may be provided a distance below strip 100 positioned on top of support surface 400. This allows animal waste created by an animal, including solid waste and/or liquid waste, to flow into gutter 410 and away from strip 100 and an animal using bed 200, 300, 500 of strip 100. In various embodiments, support surface 400 may be any suitable surface to support strip 100 in accordance with operation of the associated beds 200, 300, 500 disclosed herein, including, but not limited to, a concrete pad, ground, or a floor of a barn, shed, stable, or other structure or location in which animals rest, ruminate, and/or sleep. In addition, it should be appreciated that strip 100 may be secured to support surface 400. More specifically, strip 100 may be secured to support surface 400 by adhesive, bolts, hold down strips, or any other known or future developed suitable method of securement. As an example, strip 100 may be secured to support surface 400 by one or more hold down strips as disclosed in U.S. Pat. No. 6,935,273 to Throndsen et al., the contents of which is hereby incorporated by reference in its entirety.

Referring again to FIG. 1, each animal bed 200 includes independent support chambers or fluid chamber or bladders 210. More specifically, each animal bed 200 includes a first chamber or front support 220 and a second chamber or rear support 230. The first and second chambers 220, 230 are generally provided in alignment along an imaginary line (not shown) extending from the front end 240 to the back end 242 of the strip of animal beds 100. This enables the first and second chambers 220, 230 to respectively provide support to animals which use an associated bed 200.

First chamber 220 may include a first pipe or tube or chamber tube 222. First tube 222 is coupled to and in fluid connection with first chamber 220. Similarly, second chamber 230 may include a second pipe or tube or chamber tube 232. Second tube 232 is coupled to and in fluid connection with second chamber 230. As illustrated in FIG. 1, first tube 222 extends from first chamber 220 to front end 240 of strip 100 of animal beds. Second tube 232 extends from second chamber 230 to back end 242 of strip 100 of animal beds. First tube 222 provides a user access to fill and/or deflate first chamber 220, while second tube 232 provides a user access to fill and/or deflate second chamber 230. For example, a user may fill first chamber 220 with fluid through first tube 222, and separately fill second chamber 230 with fluid through second tube 232. The separate and independent first and second tubes 222, 232 are necessary to fill the respective first and second chambers 220, 230, as first and second chambers 220, 230 are independent or fluidly isolated from each other. It should be appreciated that FIG. 1 is an example of an arrangement of first and second tubes 222, 232 in relation to the respective chambers 220, 230. In one or more examples of embodiments, one or both of first and/or second tube(s) 222, 232 may separately extend from the respective chamber 220, 230 to any one of front end 240, back end 242, first side 244, and/or second side 246 of strip 100 of animal beds. Further, in one or more examples of embodiments, one or both of first and/or second tube(s) 222, 232 may separately extend from the respective chamber 220, 230 to any one of the margins 250, 252, 254, 256 or separating strips 257, 258 of strip 100. In addition, in one or more examples of embodiments, one or both of first and/or second tube(s) 222, 232 may separately be adapted to engage a fitting or other structural device to enable a fluid to be introduced, retained, and/or removed from chambers 220, 230.

First chamber 220 may have a width $W_1$ which extends between first side 212 and second side 214 of first chamber 220. Similarly, second chamber 230 may have a width $W_2$ which extends between first and second sides 212, 214 of second chamber 230. As illustrated in FIG. 1, the width $W_1$ of first chamber 220 is generally equal to width $W_2$ of second chamber 230. In addition, as shown in FIG. 1, first side 212 of first and second chambers 220, 230 may be provided in approximately alignment. Similarly, second side 214 of first and second chambers 220, 230 may be provided in approximately alignment.

Strip 100 of animal beds may include a plurality of margins or end margins 250, 252, 254, 256 provided around the perimeter of strip 100 of animal beds. As illustrated in FIG. 1, strip 100 of animal beds may include a front end margin 250 provided between first chamber 220 and front end 240 of strip 100. A back end margin 252 may be provided between second chamber 230 and back end 242 of strip 100. A first side margin 254 may be provided between first side 244 of strip 100 and first sides 212 of the first and second chambers 220, 230 of the bed 200 closest in proximity to first side 244 of strip 100. A second side margin 256 may be provided between second side 246 of strip 100 and second sides 214 of the first and second chambers 220, 230 of the bed 200 closest in proximity to second side 246 of strip 100.

One or more chamber separating strips 257 may be provided between first chamber 220 and second chamber 230 of each animal bed 200 in strip 100 of animal beds. Chamber separating strip 257 may extend latitudinal between first side 244 and second side 246 of strip 100 of animal beds to divide or separate first and second chambers 220, 230 of each respective animal bed 200.

One or more bed separating strips 258 may be provided between each animal bed 200 in strip 100 of animal beds. Bed separating strip 258 may extend longitudinally between front end 240 and back end 242 of strip 100 to divide or separate first and second chambers 220, 230 of consecutive animal beds 200. Bed separating strips 258 may be provided generally perpendicular to chamber separating strip(s) 257.

Figure 2:
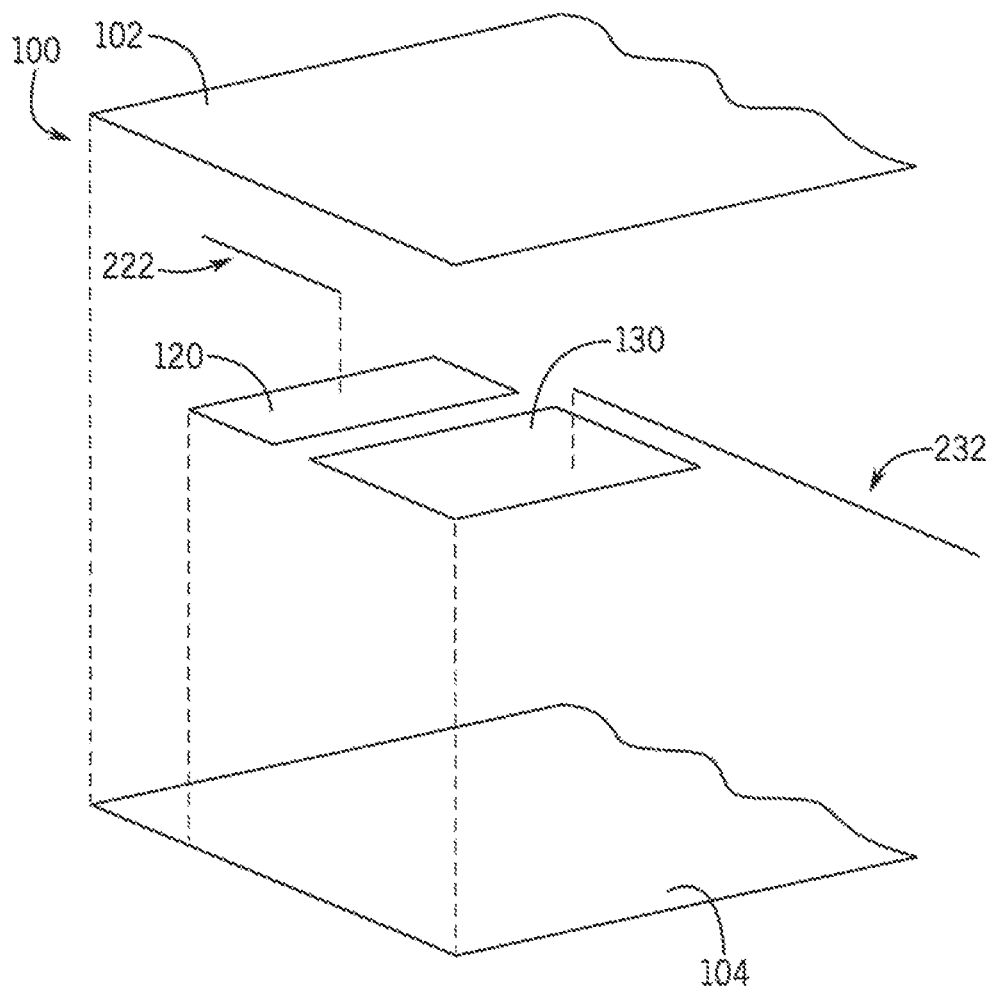
FIG. 2 is a partial exploded view of the animal bed of FIG. 1.

Front end margin 250, back end margin 252, first side margin 254, second side margin 256, chamber separating strip(s) 257, and bed separating strip(s) 258 provide a sealing area to bond and form strip 100 of animal beds. Referring to FIG. 2, strip 100 of animal beds is formed of a top belt 102 which is bonded to a bottom belt 104. The bonding forms a fluid tight seal in the sealing area defined by the margins 250, 252, 254, 256 and strips 257, 258. Top and bottom belts 102, 104 are preferably made of an elastomeric material. The material of top belt 102 preferably provides elasticity to top belt 102 so it may expand in the areas of chambers 220, 230 upon the introduction of fluid to form a convex pillow-like shape (see FIG. 7), yet return to a flat belt-like state when the fluid is removed or drained from chambers 220, 230. The material of bottom belt 104 preferably provides for ease of a fluid-tight bonding to top belt 102, such as by vulcanization. Preferably top and bottom belts 102, 104 will be made of the respective materials and have the respective associated properties in accordance with the disclosure of U.S. Pat. No. 6,935,273 to Throndsen et al., the contents of which is herein incorporated by reference in its entirety. It should be appreciated that in various embodiments, the materials used for top and bottom belts 102, 104 may be the same or different. In addition, any suitable sealing process to bond top and bottom belts 102, 104 may be implemented, including, but not limited to, heat welding, sonic welding, vibrational welding, adhesives, and/or vulcanization.

FIG. 2 is a partial exploded view of the strip 100 of animal beds 200 illustrated in FIG. 1. Referring to FIG. 2, strip 100 of animal beds is preferably formed by aligning top and bottom belts 102, 104. Sheets of separation foil 120, 130 may be provided between top and bottom belts 102, 104. Specifically, a first chamber separation foil 120 and a second chamber separation foil 130 are provided for each bed 200 in strip 100 of animal beds. First and second chamber separation foils 120, 130 are preferably made of a material having a melting point greater than the temperature required to bond top and bottom belts 120, 130 together. This allows top and bottom belts 102, 104 to be bonded together except in the area of separation foils 120, 130. Stated otherwise, first and second chamber separation foils 120, 130 prevent top and bottom belts 102, 104 from bonding in the areas where separation foils 120, 130 are in contact with belts 102, 104. In order to form first and second chambers 220, 230, separation foils 120, 130 have a suitable size and/or shape to allow top and bottom belts 102, 104 to bond around the sealing area of each chamber 220, 230. The sealing area is defined by the front end margin 250, back end margin 252, first side margin 254, second side margin 256, chamber separating strip(s) 257, and/or bed separating strip(s) 258 of each respective bed 200. The bond between belts 102, 104 around the sealing area is fluid impervious, such that any liquid provided to first and/or second chambers 220, 230 is isolated and retained in the respective chamber 220, 230. In addition, first and second chamber separation foils 120, 130 preferably are relatively thin in thickness, the thickness being measured as the distance of the separation foils 120, 130 being provided between belts 102, 104. A suitable material for separation foils 120, 130 may include, but is not limited to, Teflon or Mylar.

Chamber tubes 222, 232 may be provided in communication with respective separation foils 120, 130. More specifically, a first chamber tube 222 may be coupled to and/or in communication with first chamber separation foil 120, while a second chamber tube 232 may be coupled to and/or in communication with second chamber separation foil 130. First and second chamber tubes 222, 232 may each be a cylindrical tube or other tubular member. First and second chamber tubes 222, 232 may have a melting point greater than the temperature required to bond top and bottom belts 102, 104 together. Accordingly, like separation foils 120, 130, first and second chamber tubes 222, 232 prevent top and bottom belts 102, 104 from bonding in areas where each respective chamber tube 222, 232 is in contact with belts 102, 104, creating a fluid impervious seal such that any liquid provided to first and/or second chamber tubes 222, 232 is isolated and retained in the tubes 222, 232.

Figure 3:
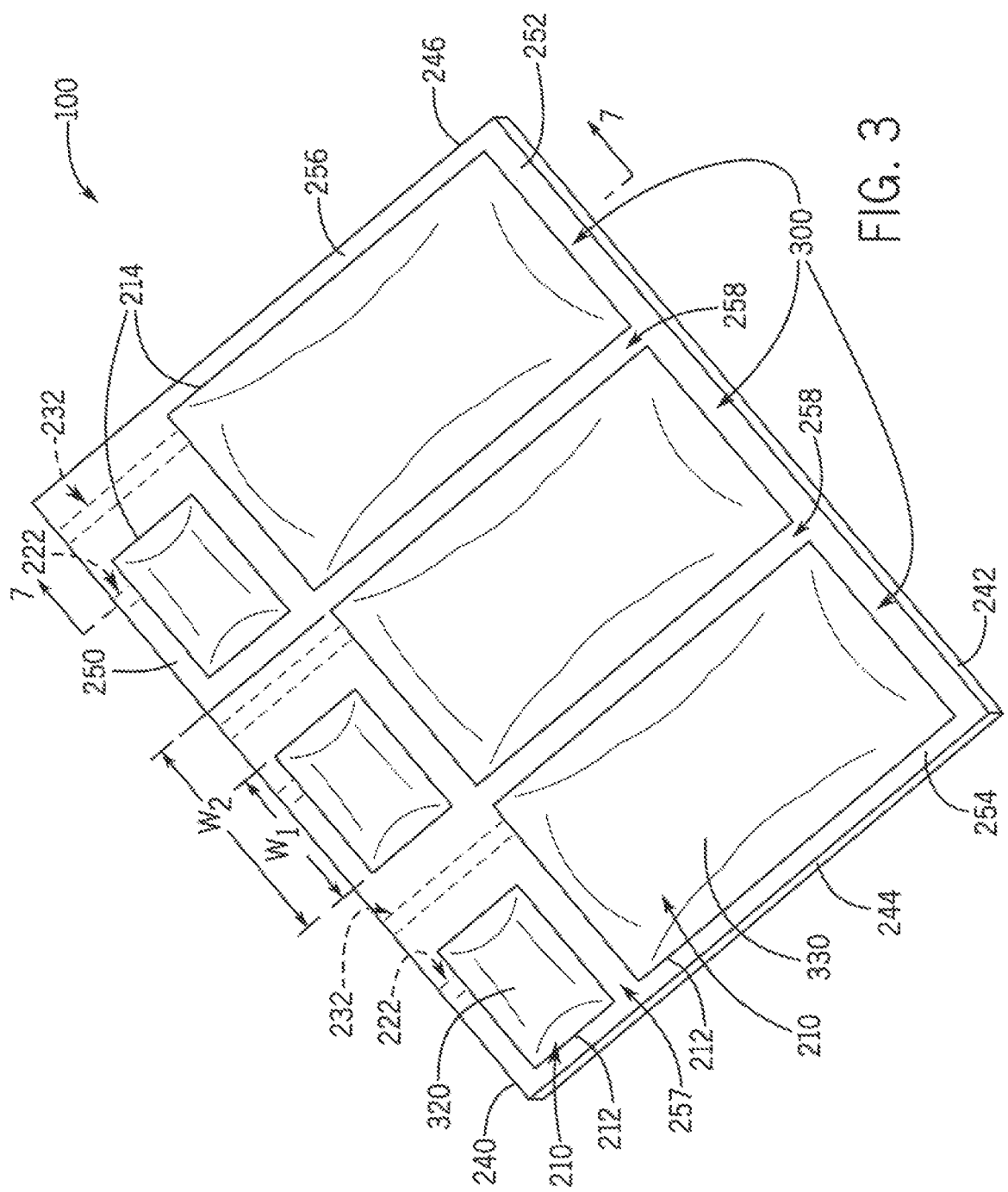
FIG. 3 is an isometric view of an alternative example of an embodiment of an animal bed having independent support chambers in accordance with the disclosure provided herein.
Figure 4:
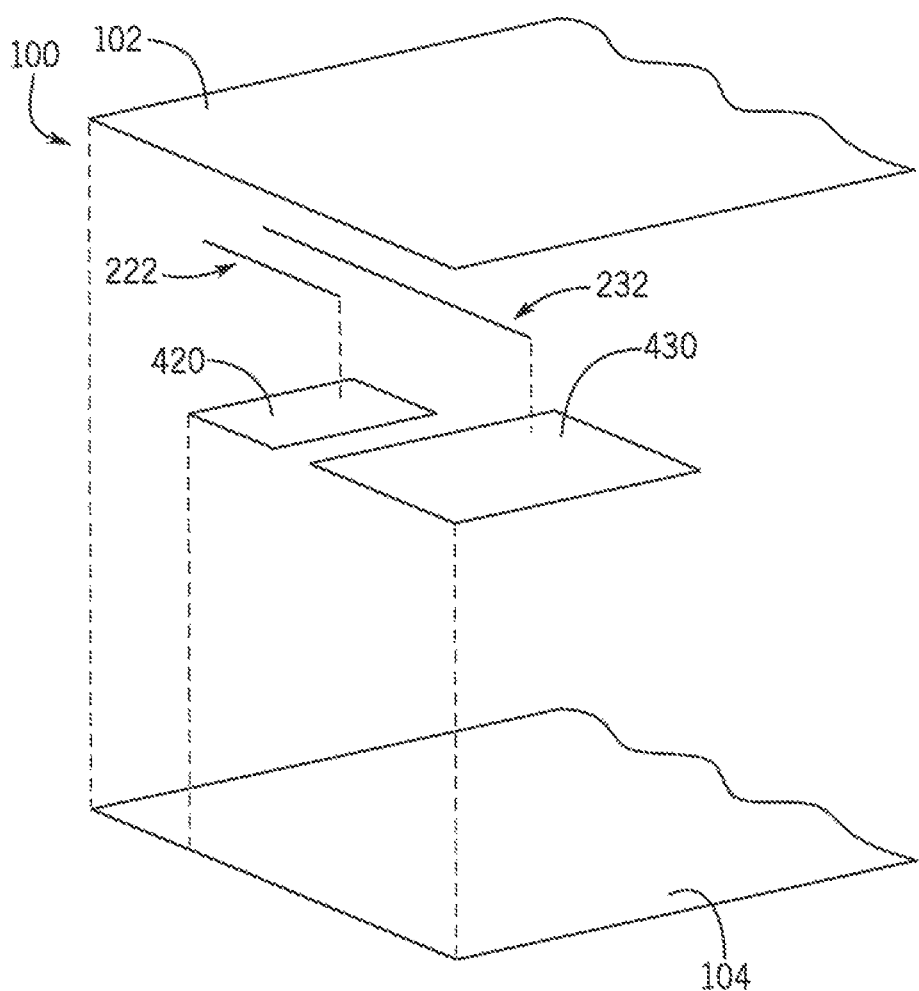
FIG. 4 is a partial exploded view of the animal bed of FIG. 3.

An alternative embodiment of the strip 100 of animal beds 300 is illustrated in FIGS. 3-4. The strip 100 and associated animal beds 300 include features which are substantially as described herein in association with the strip of animal beds 100. Particular components, operation thereof, and manufacturing thereof as described herein are substantially the same and like numbers have been used to illustrate the like components.

Referring to FIG. 3, in this embodiment, strip 100 includes a plurality of animal beds 300. Each animal bed 300 includes independent support chambers 210. The independent support chambers 210 include a first chamber 320 and a second chamber 330. First tube 222 extends from first chamber 320 to front end 240 of strip 100 of animal beds. Second tube 232 also extends from second chamber 330 to front end 240 of strip 100 of animal beds. First tube 222 provides a user access to fill and/or deflate first chamber 320, while second tube 232 provides a user access to fill and/or deflate second chamber 330. For example, a user may fill first chamber 320 with fluid through first tube 222, and separately fill second chamber 330 with fluid through second tube 232. The separate and independent first and second tubes 222, 232 are necessary to fill the respective first and second chambers 320, 330, as first and second chambers 320, 330 are independent or fluidly isolated from each other. The arrangement of first and second tubes 222, 232 illustrated in FIG. 3 advantageously allows a user to independently fill both chambers 320, 330 from the same side of strip 100, specifically front end 240.

First chamber 320 has a width $W_1$, while second chamber 330 has a width $W_2$. The width $W_1$ of first chamber 320 may be generally less than width $W_2$ of second chamber 330. This is to provide sufficient room for second tube 232 to extend from second chamber 330 to front end 240 of strip 100. In addition, first sides 212 of first and second chambers 320, 330 may be provided in approximate alignment. However, second sides 214 of first and second chambers 320, 330 are offset from one another. It should be appreciated that in one or more examples of embodiments, second side 214 of first and second chambers 320, 330 may be provided in approximate alignment, while first sides 212 of first and second chambers 320, 330 are offset from one another. In addition, in one or more examples of embodiments, neither the first or second sides 212, 214 of first chamber 320 may be provided in alignment with either of the first or second sides 212, 214 of second chamber 330. In such an arrangement, the first or second sides 212, 214 of first chamber 320 may be provided between the first and second sides 212, 214 of second chamber 330.

FIG. 4 is a partial exploded view of the strip 100 of animal beds 300 illustrated in FIG. 2. Referring to FIG. 4, strip 100 of animal beds is preferably formed by aligning top and bottom belts 102, 104. Sheets of separation foil 420, 430 may be provided between top and bottom belts 102, 104. Separation foils 420, 430 are substantially the same as separation foils 120, 130, except for the relative sizes of foils 420, 430. Specifically the width of foil 420 is less than the width of foil 430 in order to form chambers 320, 330, such that the width $W_1$ of first chamber 320 is generally less than width $W_2$ of second chamber 330 (as shown in FIG. 3).

Figure 5:
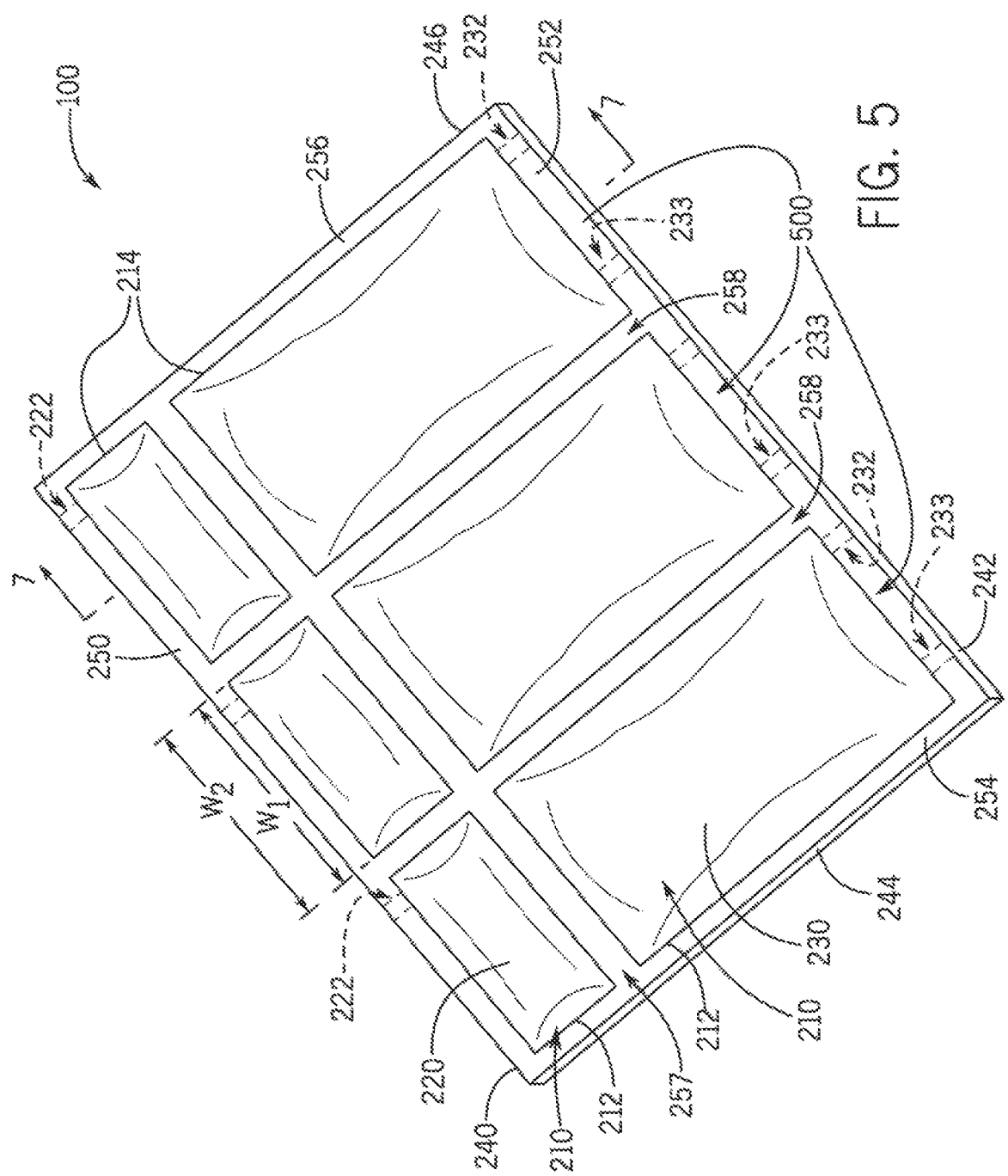
FIG. 5 is an isometric view of an alternative example of an embodiment of an animal bed having independent support chambers in accordance with the disclosure provided herein.
Figure 6:
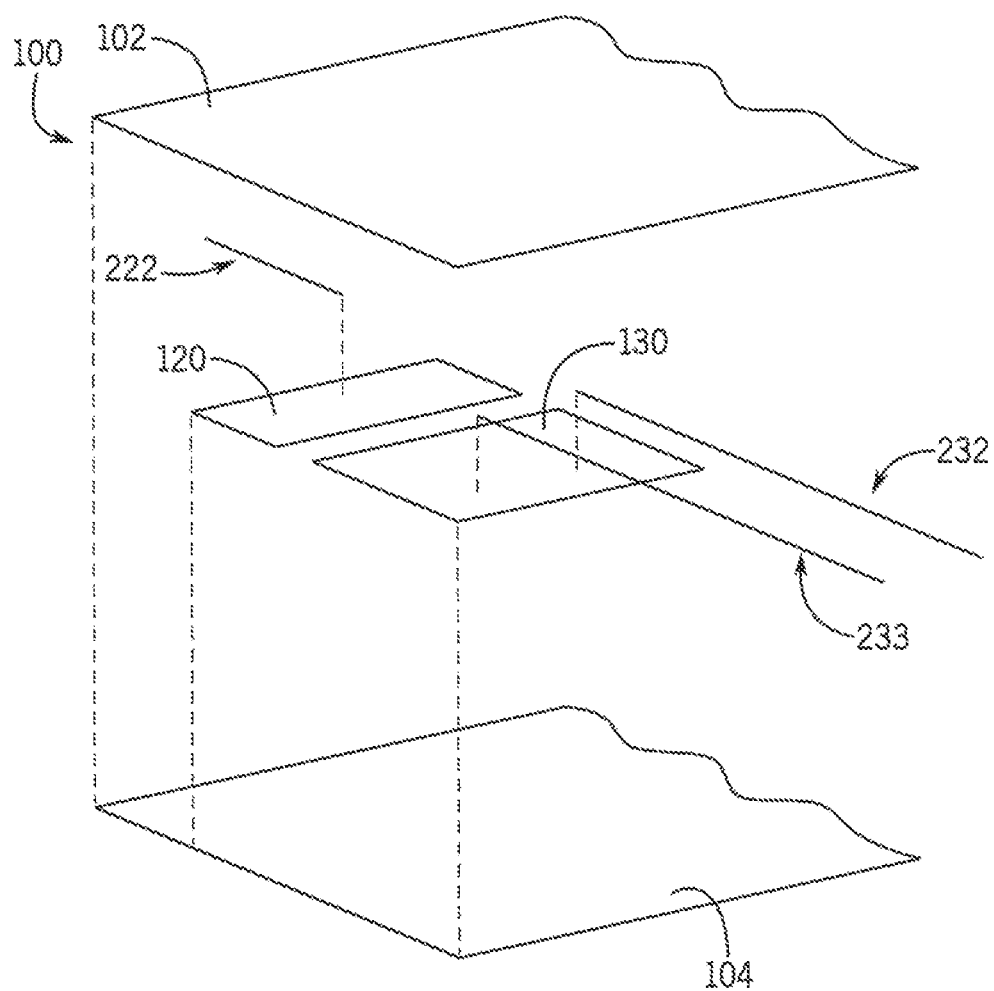
FIG. 6 is a partial exploded view of the animal bed of FIG. 5.

An alternative embodiment of the strip 100 of animal beds 500 is illustrated in FIGS. 5-6. The strip 100 and associated animal beds 500 include features which are substantially as described herein in association with the strip of animal beds 100. Particular components, operation thereof, and manufacturing thereof as described herein are substantially the same and like numbers have been used to illustrate the like components.

Referring to FIG. 5, in this embodiment, strip 100 includes a plurality of animal beds 500. Each animal bed 500 includes independent support chambers 210. The independent support chambers 210 include a first chamber 220 and a second chamber 230. First tube 222 extends from first chamber 320 to front end 240 of strip 100 of animal beds. However, second chamber 230 includes a second tube 232 and a third tube 233. The second and third tubes 232, 233 extend from second chamber 230 to rear end 242 of strip 100 of animal beds. Second and third tubes 232, 233 provide a user access to not only fill and/or deflate second chamber 230, but to separately add and/or remove fluid from second chamber 230. Such operation is discussed in further detail in association with FIGS. 15 and 16.

FIG. 6 is a partial exploded view of the strip 100 of animal beds 500 illustrated in FIG. 5. Referring to FIG. 6, strip 100 of animal beds is preferably formed by aligning top and bottom belts 102, 104. Sheets of separation foil 120, 130 may be provided between top and bottom belts 102, 104. In addition, chamber tubes 222, 232, 233 may be provided in communication with respective separation foils 120, 130. Chamber tube 233 is substantially the same as chamber tubes 222, 232.

Referring to the strip 100 of animal beds 200, 300, 500 illustrated in FIGS. 1-6, the length of each bed 200, 300, 500 and the associated strip 100 as measured from front end 240 to back end 242 is preferably between four feet and eight feet in length, more preferably between five feet and seven feet in length, and more preferably is about six feet in length. In addition, the width of each bed 200, 300 is preferably between two feet and six feet in width, more preferably between three feet and five feet in width, and more preferably is about four feet in width. The sizes of beds 200, 300, 500 will generally be related to the sizes of the animals to be supported.

In one or more examples of embodiments, the strip 100 of animal beds 200, 300, 500 illustrated in FIGS. 1-6 will have a thickness, specifically the combined thickness of top belt 102 and bottom belt 104 of preferably between six millimeters and sixty millimeters. For example, for certain animals, for example, but not limited to cows, each belt 102, 104 may have a thickness of about four millimeters, such that the total thickness of strip 100 is about eight millimeters. As another example, for larger and/or heavier animals each belt 102, 104 may have a thickness of about eight millimeters, such that the total thickness of strip 100 is about sixteen millimeters. A larger and/or heavier animal may include, but is not limited to, bulls, moose, or other animals larger than a dairy cow. The thickness of each belt 102, 104 may be varied to any desired thickness which will adequately support an animal and enable operation of the strip 100 of animal beds 200, 300, 500 in accordance with the disclosure provided herein.

In one or more examples of embodiments of the strip 100 of animal beds 200, 300, 500, front end margin 250 may extend about six inches from front end 240 to first chamber 220, 320. Back end margin 252 may extend about six inches from back end 242 to second chamber 230, 330. The width of bed separating strip 258, measured as the distance between a first side 212 of a first bed 200, 300, 500 on one side of bed separating strip 258 and a second side 214 of a second bed 200, 300, 500 on the opposite side of bed separating strip 258, may extend approximately eight inches between chambers 220, 320, 230, 330 of consecutive beds 200, 300, 500. The distance of chamber separating strip 257 between a first chamber 220, 320 and a second chamber 230, 330 of a single bed 200, 300, 500 may be extend between three to four inches. It should be appreciated that the chamber separating strip has a width sufficient to accommodate the size of the foot, paw, hoof, or other type of extremity at the end of an appendage of one or more animals using bed 200, 300, 500. In addition, it should be appreciated that the dimensions, lengths, widths, and relative sizes provided herein are for illustration only, and may be changed or may differ based upon the location of placements of strip 100, the type of animal which will use beds 200, 300, 500, the size of animal which will use beds 200, 300, 500, or other known or future developed factors associated for determining the relative sizes of each animal bed 200, 300, 500, strip 100, margins 250, 252, 254, 256 and/or strips 257, 258.

FIG. 7 illustrates a cross sectional view of the strip 100 of animal beds 200, 300, 500 illustrated in FIGS. 1, 3, and 5. More specifically, FIG. 7 illustrates a single bed 200, 300, 500 having fluid 800 respectively provided in the first chamber 220, 320, and second chamber 230, 330. The first chamber 220, 320 and second chamber 230, 330 are illustrated as having a convex pillow-like shape. The shape of the first chamber 220, 320 and second chamber 230, 330 is provided to support animals using bed 200, 300, 500. In addition, the strip 100 of animal beds 200, 300, 500 is shown positioned adjacent gutter 410. Gutter 410 is generally provided to collect and foster the removal of excreted animal waste, including solid waste, such as manure, and liquid waste, such as urine or milk.

Figure 9A:
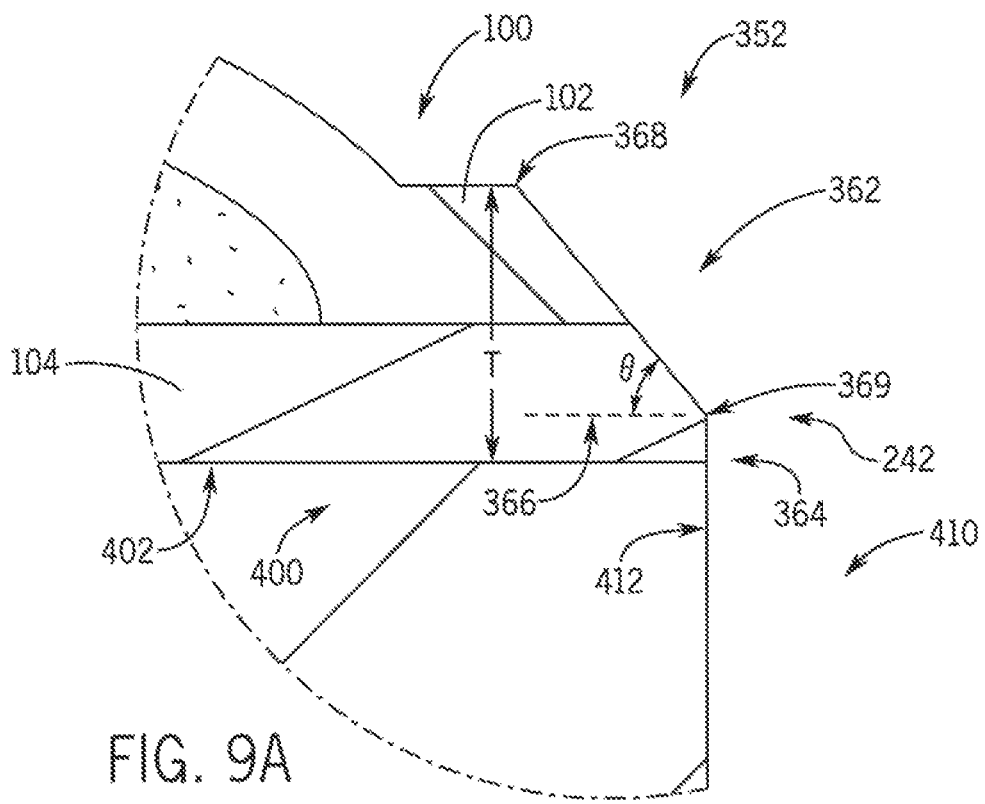
FIG. 9A is a sectional view of the animal bed of FIG. 1, FIG. 3, and FIG. 5, illustrating an example of an embodiment of an improved back end margin, taken along line 9-9 of FIG. 8.
Figure 9B:
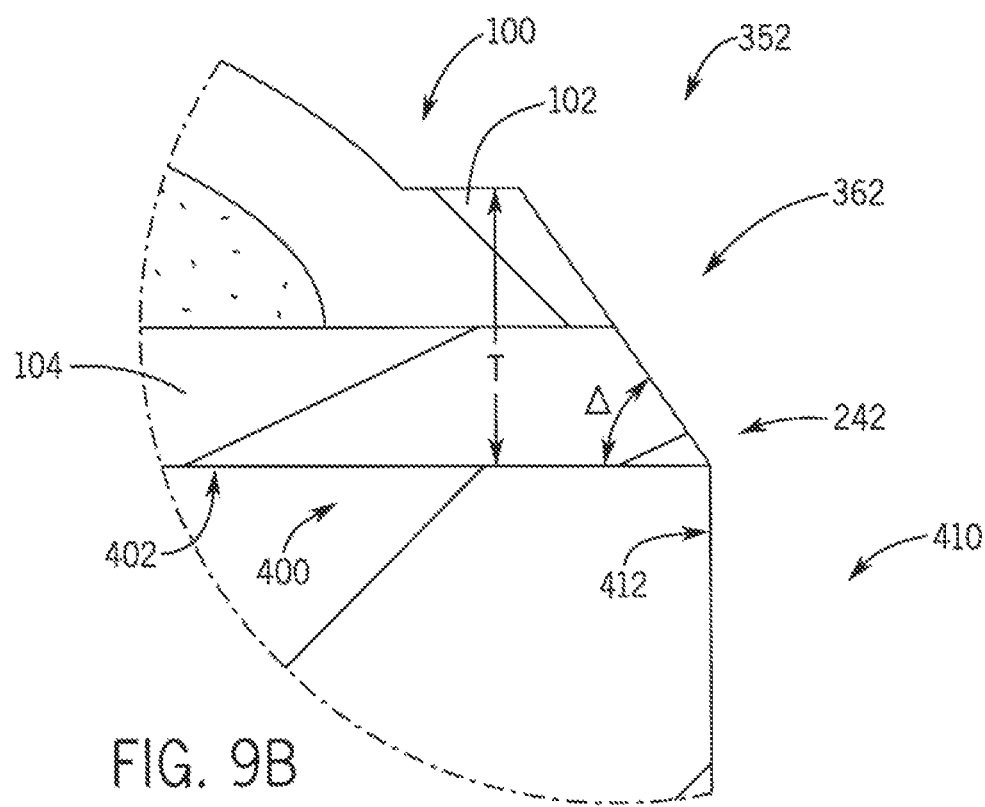
FIG. 9B is a sectional view of the animal bed of FIG. 1, FIG. 3, and FIG. 5, illustrating another example of an embodiment of an improved back end margin, taken along line 9-9 of FIG. 8.

FIG. 8 illustrates a cross sectional view of an alternative embodiment of the strip 100 of animal beds 200, 300, 500 shown in FIGS. 1, 3, and 5 illustrating an alternate back end margin 352. Specifically referring to FIG. 8, the alternate back end margin 352 may include a sloped portion 362. As shown in FIGS. 9A and 9B, sloped portion 362 may provide a decreasing thickness T of the top and bottom belts 102, 104 at the back end 242 of strip 100. The decreasing thickness T is to avoid a sharply cut edge at back end 242 which may in certain cases abrasively irritate the skin of an animal using bed 200, 300, 500 if one or more of the legs, knees, hocks, and/or underside of the animal contact, scrape, scratch, and/or hang over back edge 242 of back end margin 252, or otherwise contact back edge 242 of back end margin 252.

FIG. 9A illustrates a sectional view of an example of an improved back end margin 352 taken along line 9-9 of FIG. 8. Belt 100 is provided on a pad surface 402 of pad 400. Back end margin 352 may have a slope or bevel or sloped portion 362. Sloped portion 362 may have a decreasing thickness, T, from a first end 368 of sloped portion 362 to a second end 369 of sloped portion 362. In addition, sloped portion 362 may include a leader edge 364 on the back end 242 extending between sloped portion 362 and the side of bottom belt 104 closest to pad 400. Leader edge 364 may be aligned with gutter edge 412 of gutter 410. The slope of sloped edge 362 may be formed by angle θ, which is defined as the angle between sloped edge 362 and an imaginary line 366 approximately perpendicular to leader edge 364 and which extends at the point where leader edge 364 and sloped edge 362 meet. Angle θ is preferably an acute angle, more preferably is between about twenty-five and forty-five degrees, and more specifically is about thirty-five degrees.

FIG. 9B illustrates a close up view of an alternative example of an improved back end margin 352 taken along line 9-9 of FIG. 8. Back end margin 352 may have a slope or bevel or sloped portion 362. The slope of sloped edge 362 may be formed by angle A, which is defined as the angle between sloped edge 362 and the pad surface 402 of pad 400. Angle A is preferably an acute angle, more preferably is between about twenty-five and forty-five degrees, and more specifically is about thirty-five degrees.

Figure 10:
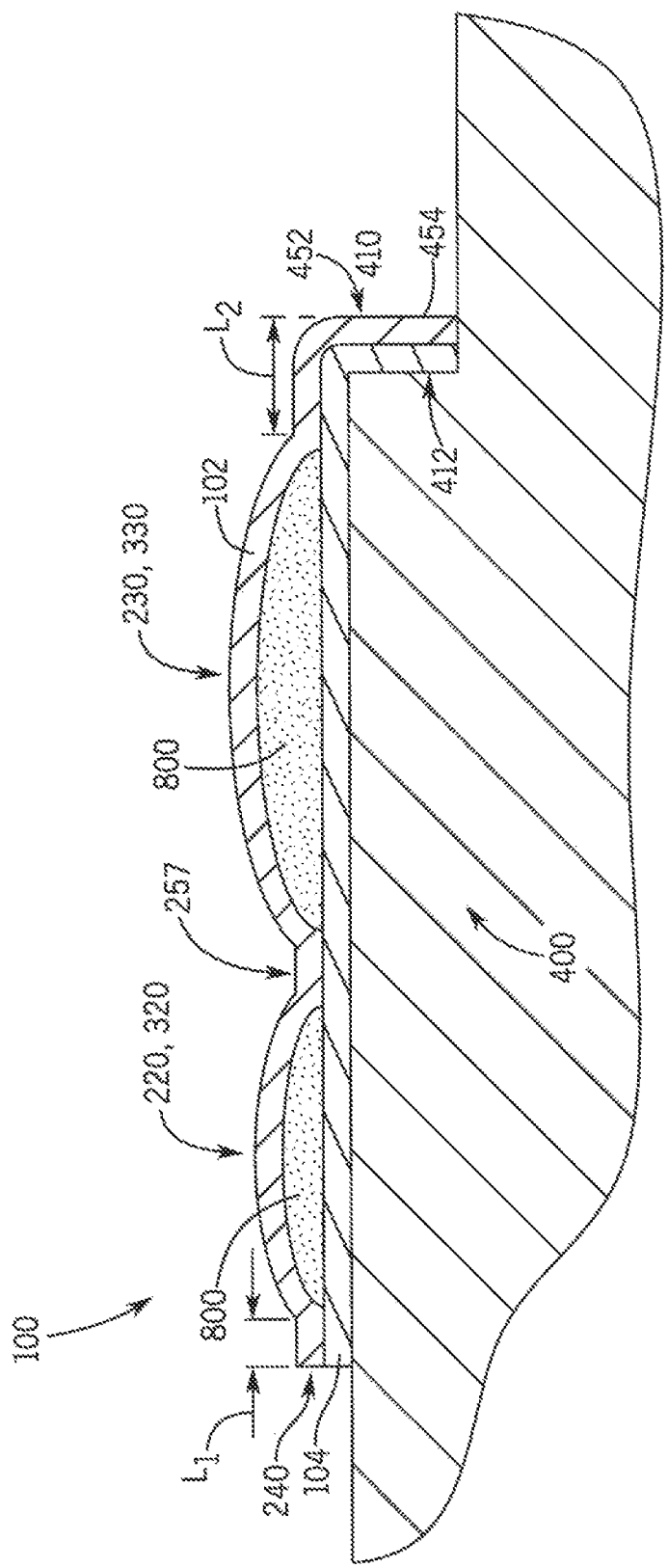
FIG. 10 is a cross sectional view of an alternative embodiment of the animal bed of FIG. 1, FIG. 3, and FIG. 5, illustrating an extended back end margin having an extended portion.

FIG. 10 illustrates a cross sectional view of an alternative embodiment of the strip 100 of animal beds 200, 300, 500 shown in FIGS. 1, 3, and 5 illustrating an extended back end margin 452. Specifically referring to FIG. 10, extended back end margin 452 may include an extended portion 454 which extends into gutter 410. More specifically, the additional material 454 of extended back end margin 452 may extend over gutter edge 412 to the floor of gutter 410. Extended portion 454 extends a second length $L_2$, measured as the distance between an edge of the second chamber 230, 330 closest to back end 242 and back end 242. $L_2$ is preferably greater than a first length $L_1$, which is measured as the distance between an edge of the first chamber closest to front end 240 and front end 240. In addition, the additional material 454 provided in the extended portion 454 may result in back end margin 452 preferably being greater than about four inches, more preferably greater than about six inches, and more preferably being equal to or greater than about twelve inches. It should be appreciated that while additional material 454 is illustrated as reaching the floor of gutter 410 or as flush with the floor of gutter 410, additional material 454 may have a length such that additional material 454 does not to reach the floor of gutter 410.

FIGS. 11-14 provide illustrations in association with a method of filling the first chamber 220, 320 and/or second chamber 230, 330 of each bed 200, 300, 500.

Figure 11:
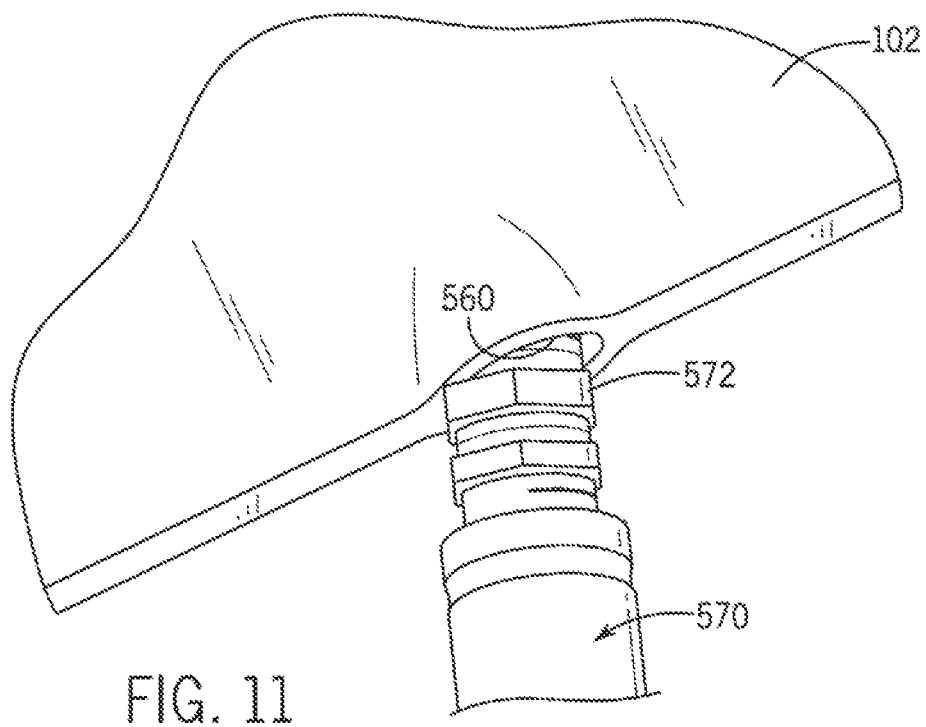
FIG. 11 is a diagram illustrating the use of one or more examples of embodiments of the animal bed of FIG. 1, FIG. 3, and FIG. 5, and more specifically injecting fluid through a tube and filling an associated first or second chamber.

Referring to FIG. 11, a user may place a fluid injection apparatus 570 into tube 222, 232. Fluid injection apparatus 570 preferably has a nozzle 572 which fits within a tube access aperture 560 provided in line with tube 222, 232 and between first and second belts 102, 104 (also see FIG. 14). In addition, nozzle 572 may be of a length which will extend into tube 222, 232. The user may then inject fluid 800 (not shown) into the associated and targeted first chamber 220, 320 or second chamber 230, 330. After the desired amount of fluid 800 is injected into the targeted chamber, the user may remove the nozzle 572 from tube access aperture 560.

Figure 12:
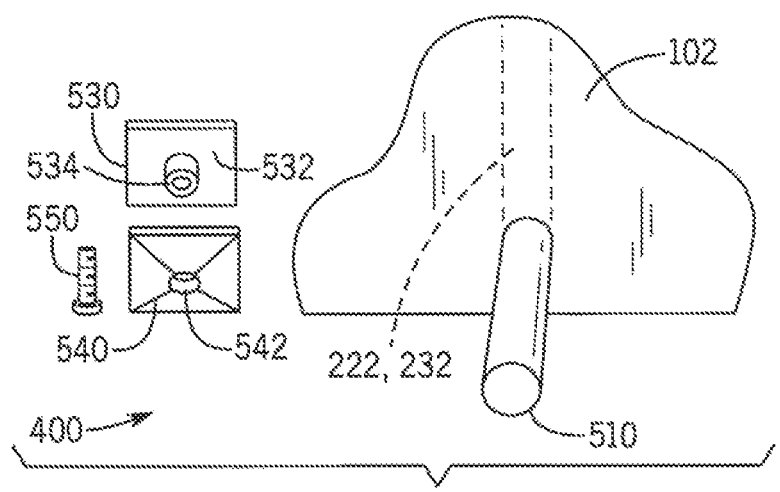
FIG. 12 is a diagram illustrating the use of one or more examples of embodiments of the animal bed of FIG. 1, FIG. 3, and FIG. 5, and more specifically punching a hole through the top belt, bottom belt, and associated tube.
Figure 13:
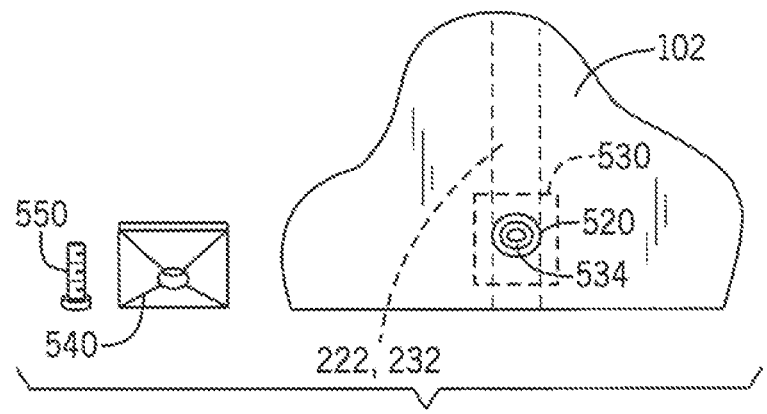
FIG. 13 is a diagram illustrating the use of one or more examples of embodiments of the animal bed of FIG. 1, FIG. 3, and FIG. 5, and more specifically installing a bottom closure under the bottom belt and in alignment with the aperture through the bottom belt, top belt, and associated tube provided between the belts.
Figure 14:
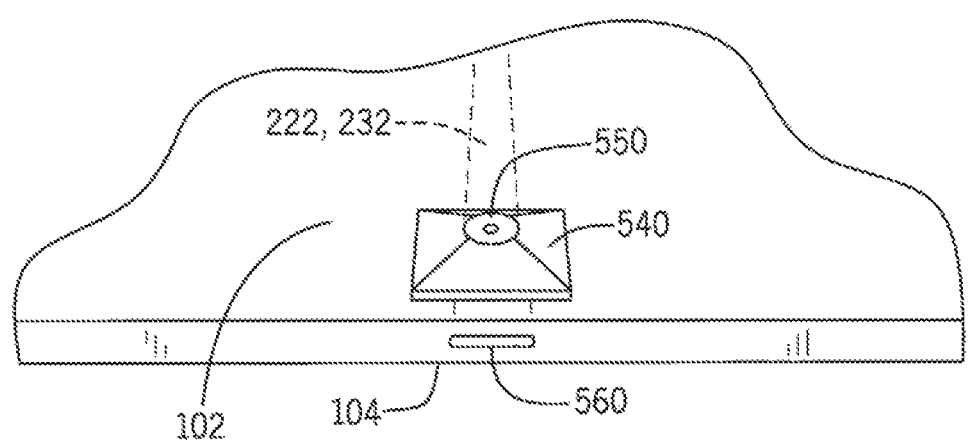
FIG. 14 is a diagram illustrating the use of one or more examples of embodiments of the animal bed of FIG. 1, FIG. 3, and FIG. 5, and more specifically illustrating the top closure and bottom closure coupled to one another by a member in order to fluidly seal the associated tube.

Referring to FIG. 12, a user may next tap an aperture or hole 520 (shown in FIG. 13) in top belt 102 in alignment with tube 222, 232. As such, the user may utilize a die or other hole creating device 510 to puncture the top belt 102 and bottom belt 104 (see FIG. 14) in alignment with and generally perpendicular to tube 222, 232. Referring to FIG. 13, once hole 520 is tapped through and/or penetrates both the top and bottom belts 102, 104, the user may place a bottom closure 530 between pad 400 and bottom belt 104. Bottom closure 530 may include a plate 532 having a female member 534 projecting from plate 532. Female member 534 has the same or related outer size, diameter, and/or shape as the aperture 520 punctured through the top and bottom belts 102, 104. Referring now to FIG. 14, the user may install a top closure 540 over the top belt 102 and in alignment with aperture 520 punched through the top and bottom belts 102, 104. Top closure 540 has a hole 542 provided in the top closure 540. A member 550 is subsequently inserted through a hole 542 provided in the top closure 540 and into the female member 534 of the bottom closure 530. The user may tighten the member 550, as member 550 preferably has an external thread adapted to mate with a complementary internal thread provided in female member 534, drawing the top closure 540 and bottom closure 530, together, compressing the top and bottom belt material 102, 104 around the aperture 520 and tube 222, 232, collapsing tube 222, 232 and creating a fluid tight seal. This ensures the fluid 800 injected into the targeted first chamber 220, 320 or second chamber 230, 330 remains in the targeted chamber. Hole 542 has an outer diameter at least equal to the head of member 550. This recessed hole 542 allows the head to member 550 to be substantially received by hole 542, forming the recessed closure illustrated in FIG. 14. The recessed closure advantageously reduces portions of member 550 extending above top closure 540, reducing the risk of a projection which may contact and/or injure an animal. Once the fluid tight seal is created between top and bottom closures 530, 540, the other, remaining chambers may be filled by repeating one or more of the above steps.

Figure 15:
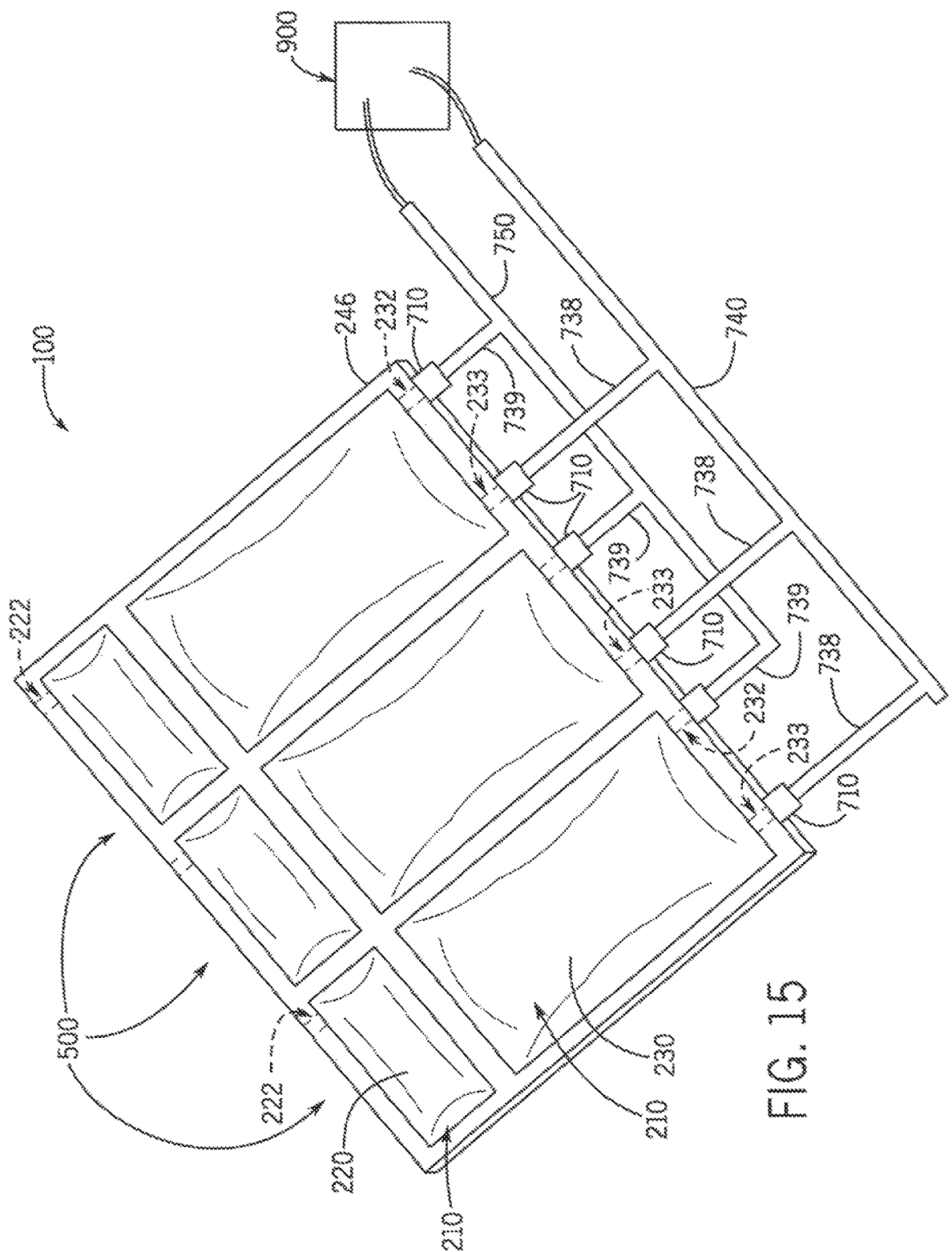
FIG. 15 is an isometric view of one or more examples of embodiments of a system implementing an embodiment of an animal bed having independent support chambers in accordance with the disclosure provided herein, and more specifically a system to control fluid temperature of a fluid provided in a chamber of the animal bed, the system in communication with the chamber from the back end of the animal bed.
Figure 16:
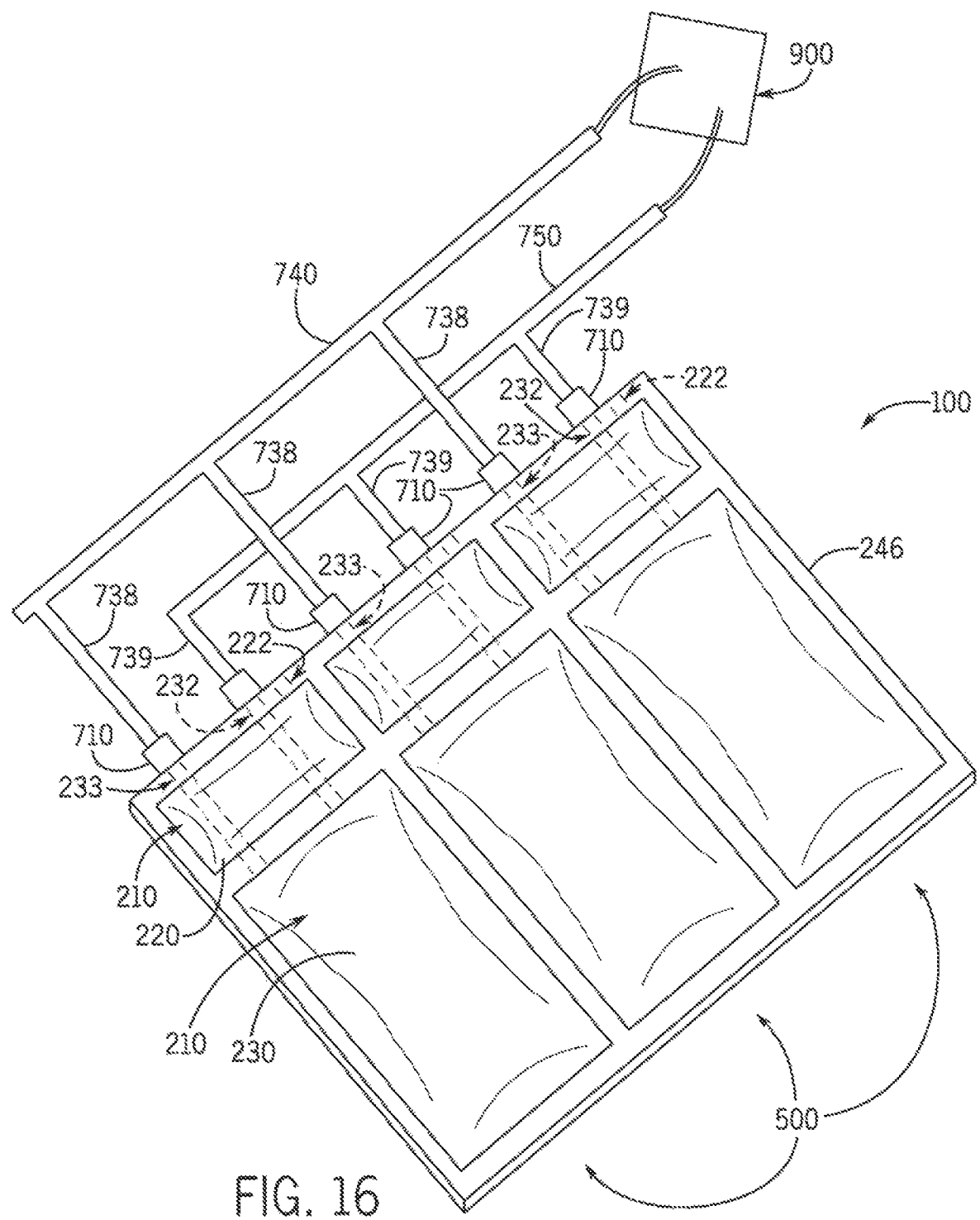
FIG. 16 is an isometric view of one or more examples of embodiments of a system implementing an embodiment of an animal bed having independent support chambers in accordance with the disclosure provided herein, and more specifically a system to control fluid temperature of a fluid provided in a chamber of the animal bed, the system in communication with the chamber from the front end of the animal bed.

FIGS. 15 and 16 illustrate one or more examples of embodiments of a system incorporating a strip 100 of animal beds 500. More specifically, FIGS. 15 and 16 illustrate a strip 100 of animal beds 500 in which second chamber 230 is temperature controlled in order to advantageously heat or cool animals using each bed 500. Each animal bed 500 of strip 100 includes a coupling 710 coupled to second and third tubes 232, 233 of second chamber 230. Coupling 710 may be any suitable fitting or connector for coupling a fluid supply to second and third tubes 232, 233. For example, coupling 710 may be an embedded fitting embedded between top and bottom belts 102, 104 through tube access aperture 560 (shown in FIGS. 11 and 14), a threaded connector, flange connector, or any other suitable known or future developed fitting or connector for coupling a liquid or fluid supply to second and third tubes 232, 233.

Each of the second tubes 232 may be coupled to piping or lines 739, while each of the third tubes may be coupled to piping or lines 738. Lines 738 may be coupled to a liquid supply header 740, while lines 739 may be coupled to a liquid return header 750. Liquid supply header 740 and liquid return header 750 may then be coupled to a temperature control system 900. Temperature control system 900 may include various devices to assist in controlling the temperature of the fluid provided to second chambers 230, including, but not limited to, a heat source, a heat exchanger, make up fluid, one or more pumps, one or more pressure control device, one or more temperature control device, and/or one or more volume control device. Thus, temperature control system 900 may control and/or modify the temperature of fluid provided to second chamber 230, for example, heating the fluid provided to second chamber 230, or cooling the temperature of fluid provided to second chamber 230. In addition, system 900 may control and/or modify the pressure in second chamber 230, for example by modifying the amount or volume of fluid provided to second chamber 230. Referring only to FIG. 15, temperature control system 900 may be in communication with second chamber 230 through the back end 242 of strip 100. Referring only to FIG. 16, temperature control system 900 may be in communication with second chamber 230 through the front end 240 of strip 100. It should be appreciated in various embodiments that temperature control system 900 may be in communication with second chamber 230 through any suitable ends or margins of strip 100.

Referring back to FIGS. 15 and 16, in operation, fluid may be provided through supply header 740 and piping 738 to each respective third tube 233. The fluid subsequently is provided to each second chamber 230. Fluid may then be removed from each second chamber 230 through second tube 232. The fluid may exit through second tube 232 to piping 739 and liquid return header 750. The liquid may then move to temperature control system 900 where the liquid may be increased in temperature or decreased in temperature. The changed temperature liquid will exit temperature control system 900 to liquid supply header 740, where the cycle will repeat. It should be noted that the strip 100 of animal beds 500 and associated system of FIGS. 15 and 16 advantageously provide temperature to only the second chamber 230, which generally supports the body of an animal using each respective animal bed 500. It is not always necessary to temperature control the first chamber 220, as unlike the body of an animal; the knees or front leg portion of an animal may not need warming or cooling.

There are several advantages to the animal bed disclosed herein. The animal bed having independent support chambers provides better support for animal pressure points in the lying position. The independent and separate support chambers evenly support and float animal pressure points while the animal is lying on the bed. This is because the front chamber and back chamber are separate and unique flotation devices. Thus, the front chamber independently supports and floats the front pressure points, including the legs and/or knee of an animal, while the rear chamber independently supports and floats the rear pressure points, including the hock, hind legs, underbelly, underside and/or udder of the animal. In addition, both the front and rear pressure points of the animal are floated and/or supported at the same time, allowing for blood to flow through the front and rear pressure points, reducing the loss of blood flow in these areas for extended resting periods, and reducing the risk of injury to the pressure points. Further, the independent support chambers maintain a pillow of fluid in the front chamber to cushion the knees and/or front legs of the animal when the animal gets up. This reduces pressure on the knees and/or front legs of the animal when the animal gets up by reducing contact of the knees and/or front legs with the hard floor under the animal bed. Thus, the independent support chambers cushion front and rear pressure points of an animal during descent and ascent of the animal between a standing and lying position. The independent and separate support chambers also prevent fluid from traveling back and forth between chambers. This further improves protection for important pressure points of animals, including, but not limited to, legs, knees, hocks, udders, teats, and the underside area of the animals by reducing changes in the cushioning effect of the support chambers. In addition, the animal bed disclosed herein advantageously can be tailored to have a desired fluid volume, fluid pressure, and/or fluid amount to support different animals, different areas of animals, and/or different types of animals. Further, the improved back end margin of the animal bed disclosed herein advantageously avoids a sharply cut edge at the back end of the strip which may in certain instances irritate the skin of an animal using a bed if one or more of the legs of the animal contact, scrape, scratch, hang over back edge of the back end margin, or otherwise contact back edge of the back end margin. In addition, the improved back end margin of the animal bed disclosed herein advantageously improves the cleanliness of the beds and assists in the cleaning of the beds, as solid and/or liquid waste from the animal may flow down the improved back end margin into the gutter and away from each bed. The extended back end margin advantageously provide a barrier such that the sensitive legs of animals will be cushioned against the edge of the gutter, improving the physical health of animals and assisting in the avoidance of creating injuries and/or open sores from contact by the animal with the gutter and/or the gutter edge. In addition, the extended back end margin advantageously improves cleanliness of the beds and assists in the cleaning of the beds, as liquid waste and/or solid waste from the animal may flow down the extended portion of the back end margin and away from each bed. These and other advantages are provided by the animal bed disclosed herein.

Although various representative examples of embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

What is claimed is:

1. A bed for at least one animal comprising:
   a bed having a first chamber and a second chamber separated from one another by a fluid impervious chamber separating strip,
   whereby the first chamber is configured to receive liquid to form a convex shaped chamber usable to cushion a front pressure point of an animal; and
   whereby the second chamber is configured to receive liquid to form a convex shaped chamber usable to cushion a rear pressure point of the animal.

2. A strip of beds comprising the bed for at least one animal of claim 1.

3. The bed for at least one animal of claim 1, wherein the front pressure point includes a front leg and/or knee of the livestock, and the rear pressure point includes a hock, hind leg, underbelly, underside and/or udder of the livestock.

4. The bed for at least one animal of claim 1, wherein the first and second chambers are sized differently relative to each other.

5. The bed for at least one animal of claim 1, wherein a chamber separating strip is provided between the first chamber and the second chamber and configured to accommodate a foot, hoof, paw or other extremity at the end of an appendage of the livestock.

6. The bed for at least one animal of claim 1, wherein the first chamber is relatively smaller than the second chamber.

7. A strip of animal beds comprising the animal bed system for supporting at least one animal of claim 6.

8. The bed for at least one animal of claim 6, wherein the first chamber is relatively smaller in dimension than the second chamber.

9. The bed for at least one animal of claim 6, wherein the first chamber is relatively smaller in area than the second chamber.

10. The bed for at least one animal of claim 6, wherein the first chamber and the second chamber are separated from one another by a chamber separating strip.

11. The bed for at least one animal of claim 10, wherein the chamber separating strip is configured to accommodate a foot, hoof, paw or other extremity at the end of an appendage of livestock using the bed.

12. The bed for at least one animal of claim 6, wherein the first chamber is configured to form a pillow of liquid to support and/or float a front pressure point of livestock using the bed.

13. The bed for at least one animal of claim 10, wherein the second chamber is configured to form a pillow of liquid to support and/or float a rear pressure point of livestock using the bed.

14. The bed for at least one animal of claim 12, wherein the second chamber is configured to form a second pillow of liquid to support and/or float a rear pressure point of the livestock using the bed.

* * * * *